(12) United States Patent
Ilch (10) Patent No.: US 10,507,576 B2
(45) Date of Patent: Dec. 17, 2019

(54) INDUSTRIAL ROBOT

(71) Applicant: autonox robotics GmbH, Kehl (DE)

(72) Inventor: Hartmut Ilch, Kehl (DE)

(73) Assignee: autonox robotics GmbH, Kehl (DE)

( * ) Notice: Subject to any disclaimer, the term of this patent is extended or adjusted under 35 U.S.C. 154(b) by 0 days.

(21) Appl. No.: 15/574,258

(22) PCT Filed: Sep. 22, 2016

(86) PCT No.: PCT/DE2016/100443
§ 371 (c)(1),
(2) Date: Nov. 15, 2017

(87) PCT Pub. No.: WO2017/050319
PCT Pub. Date: Mar. 30, 2017

(65) Prior Publication Data
US 2018/0085913 A1    Mar. 29, 2018

(30) Foreign Application Priority Data

Sep. 24, 2015  (DE) .......................... 10 2015 218 429

(51) Int. Cl.
*B25J 9/00* (2006.01)
*B25J 9/12* (2006.01)
*B25J 17/02* (2006.01)

(52) U.S. Cl.
CPC ............ *B25J 9/0051* (2013.01); *B25J 9/123* (2013.01); *B25J 17/0266* (2013.01); *Y10S 901/29* (2013.01)

(58) Field of Classification Search
CPC ........ B25J 9/0078; B25J 9/12; B25J 17/0266; B25J 19/0029; B25J 9/003; B25J 9/0063;
(Continued)

(56) References Cited

U.S. PATENT DOCUMENTS 4,739,669 A * 4/1988 Yokose ................. B23Q 5/404
384/519
4,976,582 A * 12/1990 Clavel .................... B25J 9/1065
108/138
(Continued)

FOREIGN PATENT DOCUMENTS

DE  10 2014 223 393 A1  5/2016
EP   0 250 470 B1       7/1991
(Continued)

OTHER PUBLICATIONS

International Search Report of PCT/DE2016/100443, dated Feb. 16, 2017.
(Continued)

*Primary Examiner* — Victor L Macarthur
*Assistant Examiner* — T. Scott Fix
(74) *Attorney, Agent, or Firm* — Collard & Roe, P.C.

(57) ABSTRACT

An industrial robot with parallel kinematics is proposed which is equipped with a robot base (1), a carrier element (2) for receiving a gripper, a tool or a machine element, at least two moveable actuating units (4), one of which ends is connected to actuating-unit drives (6) arranged on the robot base (1) and the other end is moveably connected to the carrier element (2), a telescope (13) that is moveably arranged between the robot base (1) and the carrier element (2), a first joint (17) with multiple degrees of freedom, by means of which joint the telescope (13) is moveably held on the robot base (1), a second joint (23) with multiple degrees of freedom, by means of which joint the telescope (13) is moveably held on the carrier element (2), whereby the position of the first joint (17) can be displaceably arranged relative to the robot base (1).

12 Claims, 5 Drawing Sheets

(58) Field of Classification Search
CPC ....... B25J 9/0072; B66F 11/00; E04H 12/182; F16H 25/2204; Y10T 74/20317
USPC .......................................... 74/490.02, 490.05
See application file for complete search history.

(56) References Cited

U.S. PATENT DOCUMENTS

| | | | | |
|---|---|---|---|---|
| 5,035,094 | A * | 7/1991 | Legare | B63B 15/0083 343/903 |
| 5,094,118 | A * | 3/1992 | Morita | B25J 9/102 74/424.9 |
| 5,279,084 | A * | 1/1994 | Atsukawa | B66F 3/08 52/111 |
| 5,811,139 | A * | 9/1998 | Hehl | B29C 45/66 192/141 |
| 6,896,473 | B2 | 5/2005 | Schuler | |
| 9,370,867 | B2 | 6/2016 | Ilch | |
| 2003/0064816 | A1* | 4/2003 | Schuler | B25J 17/0266 464/102 |
| 2010/0206120 | A1* | 8/2010 | Kinoshita | B25J 17/0266 74/490.06 |
| 2012/0118097 | A1* | 5/2012 | Ilch | B25J 17/0266 74/490.05 |
| 2013/0014605 | A1* | 1/2013 | Caveney | B25J 18/04 74/490.03 |
| 2014/0116166 | A1* | 5/2014 | Yamamoto | F16H 25/2204 74/89.4 |
| 2014/0338489 | A1* | 11/2014 | Peng | B25J 17/0266 74/490.03 |
| 2015/0321345 | A1* | 11/2015 | Hahakura | B25J 9/042 74/490.03 |
| 2016/0311632 | A1 | 10/2016 | Westermeier et al. | |

FOREIGN PATENT DOCUMENTS

| | | |
|---|---|---|
| EP | 1 293 691 A1 | 3/2003 |
| EP | 2 461 948 B1 | 10/2013 |
| JP | H09-47995 A | 2/1997 |
| JP | 2014-39977 A | 3/2014 |
| JP | 2014-61559 A | 10/2014 |
| KR | 101383878 B1 | 4/2014 |
| WO | 99/10137 A1 | 3/1999 |
| WO | 2011/015189 A1 | 2/2011 |

OTHER PUBLICATIONS

German Search Report in DE 10 2015 218 429.3, dated Jul. 13, 2016, with English translation of relevant parts.

* cited by examiner

INDUSTRIAL ROBOT

CROSS REFERENCE TO RELATED APPLICATIONS

This application is the National Stage of PCT/DE2016/100443 filed on Sep. 22, 2016, which claims priority under 35 U.S.C. § 119 of German Application No. 10 2015 218 429.3 filed on Sep. 24, 2015, the disclosure of which is incorporated by reference. The international application under PCT article 21(2) was not published in English.

The invention is based on an industrial robot with parallel kinematics, comprising a robot base, a carrier element for receiving a gripper or a tool and several actuating units for moving the carrier element.

Industrial robots of this type with parallel kinematics are used to move, position and/or process an object in space. They comprise a robot base arranged in a fixed position and a moveable carrier element for receiving a gripper, a tool or other machine element. At least two actuating units are connected at their one end to the robot base and at their other end to the carrier element. Each actuating unit is moved by a drive assigned to it which is arranged on the robot base. These drives of the actuating units are referred to as actuating-unit drives. A movement of the actuating units causes a movement of the carrier element. For example, a gripper for picking up an object or a tool for processing an object or a machine element such as a bearing or a gearbox can be arranged on the carrier element. To this end the carrier element is equipped with a receiver for a gripper, a tool or a machine element. The gripper, the tool or the machine element arranged on the carrier element can be moved in several dimensions in space in a targeted manner by means of the coordinated movement of the driven actuating units. The actuating units effect a spatial parallelogram guidance of the carrier element. The parallel kinematics resulting from this enable a rapid and precise movement of the carrier element and of the gripper, tool or machine element arranged thereon. This movement is a translatory movement of the carrier element. If the industrial robot is equipped with three actuating units, the translatory movement is in three directions in space. The movement has three degrees of freedom and can be described in a coordinate system with x, y and z axes. If the industrial robot is equipped with two actuating units, the translatory movement is in two directions in space.

In this case the movement has two degrees of freedom and can be described in a coordinate system with x and z axes.

In addition to this translatory movement of the carrier element, a torque can be generated by a further drive on the robot base and transmitted to a gripper, tool or machine element arranged on the carrier element. The torque from a rotation drive arranged on the robot base can be transmitted to a gripper, tool or machine element arranged on the carrier element by means of a telescope that at both ends is equipped with a joint having multiple degrees of freedom. The joints must take a form such that they can transmit a torque. Such a joint with multiple degrees of freedom is for instance a cardan joint, a universal joint, a constant velocity joint or a homokinetic joint. The telescope is moveably held on the robot base by means of a first joint with multiple degrees of freedom and on the carrier element by means of a second joint with multiple degrees of freedom. In this case the telescope takes the form of a telescopic axis. It can also be referred to as a telescopic articulated shaft. A further degree of freedom of the industrial robot is generated through the rotation drive and the telescopic axis. This rotational movement serves not to position the gripper, tool or machine element in space but instead also to actuate the gripper, tool or machine element itself, for example opening and closing the gripper or turning the tool or machine element. If the industrial robot is equipped with three actuating units, the telescopic axis which transmits the torque from the drive to a gripper, tool or machine element on the carrier element is referred to as a fourth axis.

Such robots include delta robots, for example. These are equipped with at least two actuating units as control arms. The actuating or control arms comprise an upper and a lower arm section which are connected to one another in a moveable manner. Each of the upper arm sections is driven by an actuating arm drive, for example a motor-gear unit. The actuating-arm drive generates for instance a torque that is transmitted to the associated upper arm section by means of the gear. The drives are arranged on the robot base. The movement of the upper arm sections is transferred via the lower arm sections to the carrier element. Each lower arm section has two parallel rods or struts running in the longitudinal direction of the arm section, which at their one end are moveably connected to the associated upper arm section and at their other end are moveably connected to the carrier element.

The actuating-arm drives can instead also generate a linear driving force by means of which an associated arm section is moved along an associated linear axis of movement in a prescribed direction of movement. Parallel kinematic robots with linear drives are known as linear delta robots.

In addition to delta robots, industrial robots with parallel kinematics also include cable robots. Cable robots are equipped with cables as actuating units. Each cable is connected by its one end to a drive. The drives take the form of rotation or linear drives which determine the free length of the cables by winding and unwinding on a shaft connected to a cable end or by advancing or retracting a push rod connected to a cable end. At their end facing away from the drive, the cables are connected to a carrier element for a gripper or a tool. It must be ensured thereby that the cables are tensioned. The gripper or the tool element arranged on the carrier element can be moved in several dimensions in a targeted manner by means of the coordinated movement of the drives.

A gripper, a tool or a machine element arranged on the carrier element can additionally be actuated via a pneumatic, hydraulic or electric drive. Sensors for monitoring and controlling the gripper, tool or machine element can also be arranged on the carrier element. For this purpose, hydraulic, pneumatic, electric or optical supply lines are routed from the robot base to the carrier element. The supply lines are used for the transport of compressed air, a pressure medium, electric current or light. Light can be necessary, for example, for a sensor arranged on the gripper or on the tool. The supply lines can be arranged in a hollow telescope that at one end is moveably held on the robot base and at the other end is moveably held on the carrier element. This telescope can either serve exclusively to accommodate the supply lines or additionally take the form of a telescopic axis as described above.

An industrial robot of this type with actuating units in the form of control arms is known, for example, from EP 250 470 A1.

Known industrial robots comprising parallel kinematics and having a telescope which is arranged between the robot base and the carrier element and takes the form of a telescopic axis or serves the arrangement of supply lines have the disadvantage that the movement stroke of the carrier element is limited by the telescope, since the telescope exhibits a maximum and a minimum axial length. Even if the actuating units define a greater volume within which the carrier element can be moved, this volume cannot be utilised fully due to the telescope.

The object of the invention is to provide an industrial robot comprising parallel kinematics with a telescope which is arranged between the robot base and the carrier element and takes the form of a telescopic axis or serves the arrangement of supply lines, whereby the volume or the space within which the carrier element can be moved is enlarged.

This object is achieved by an industrial robot having the features of claim 1. The industrial robot is characterised in that a first joint exhibiting multiple degrees of freedom and by means of which the telescope is moveably held on the robot base is displaceably arranged in respect of its position relative to the robot base. The first joint can therefore change its position relative to the robot base. Since the telescope is arranged with its one end at the first joint, the corresponding end of the telescope can also change its position relative to the robot base. This means that the volume within which the other end of the telescope and the carrier element connected to the telescope can be moved is enlarged. The carrier element is connected to the telescope by means of a second joint, whereby the second joint has multiple degrees of freedom.

The telescope exhibits at least two telescopic tubes that are displaceably guided in one another. When the telescope exhibits its minimum length, all telescopic tubes are pushed in one another. When the telescope exhibits its maximum length, the telescopic tubes are pulled so far apart that they overlap only in an end section. The area of the overlap must be large enough that the stability of the telescope is not impaired and a buckling of the telescope is avoided.

The displacement of a first joint relative to the robot base is effected along a prescribed axis. This axis can run perpendicularly to the robot base or at an angle to the robot base different from 90°. The axis can also be parallel to the robot base. This depends on the respective application. If the robot base is formed by a plate, the plane prescribed by the robot base corresponds to one of the two surfaces of the plate. If the robot base is formed by a frame or a rack, however, the plane prescribed by the robot axis is defined by the axes of the actuating-unit drives.

The first joint, which exhibits multiple degrees of freedom, can for instance be a cardan joint or a constant velocity joint. Constant velocity joints are also referred to as homokinetic joints.

According to an advantageous embodiment of the invention, on the robot base is arranged a linear drive that moves the first joint in respect of its position relative to the robot base. The linear drive moves the first joint along the aforementioned axis. The linear drive can be equipped with an electric motor. It can also be equipped with a hydraulic or pneumatic drive or other actuator.

According to a further advantageous embodiment of the invention, the linear drive comprises a spindle drive.

According to a further advantageous embodiment of the invention, the spindle drive exhibits a spindle. The first joint is linked directly or indirectly to the spindle. The axis along which the first joint is moved corresponds to the longitudinal axis of the spindle and can also be referred to as a spindle axis.

According to a further advantageous embodiment of the invention, the linear drive on the robot base is arranged on the side facing away from the carrier element. It thereby does not impair the actuating units. The robot base exhibits a through opening through which the spindle or a shaft linked to the spindle is led.

According to a further advantageous embodiment of the invention, the spindle drive takes the form of a ball screw drive.

According to a further advantageous embodiment of the invention, the linear drive encompasses a positively locked shaft arrangement.

According to a further advantageous embodiment of the invention, the telescope takes the form of a telescopic axis. A rotary lifting module is arranged on the robot base, whereby a rotary drive for the telescopic axis and the linear drive are parts of the rotary lifting module. The rotary lifting module combines the function of a screw drive and a positively locked shaft arrangement. To that end a spline shaft nut is arranged on one spindle in addition to a screw drive nut. The screw drive nut and the spline shaft nut are each driven to rotate by means of a separate drive. Depending on whether the screw drive nut and the spline shaft nut are driven separately or jointly, the spindle can be driven to a linear, rotational or spiral movement. This means that the rotary lifting module can drive the first joint and the telescopic axis connected to it to a rotation, a translation or a combination of translation and rotation. If the screw drive nut and the spline shaft nut are equipped with balls, a backlash-free, positionally precise and low-friction movement is enabled.

According to a further advantageous embodiment of the invention, the robot base is equipped with a linear guide having a guide body. The first joint is linked directly or indirectly to the guide body. The actuating units exert a force on the carrier element. This force is transmitted to the first joint by means of the second joint and the telescope, so that a tension or pressure is exerted on the first joint. Due to the linear guide the first joint can change its position relative to the robot base according to this tension or pressure. In this case an additional linear drive is omitted.

According to a further advantageous embodiment of the invention, the linear guide takes the form of a slideway or rolling guideway, as shafts or as a rail guide arrangement.

According to a further advantageous embodiment of the invention, the first joint is a cardan joint.

According to a further advantageous embodiment of the invention, the first joint is a constant velocity joint.

According to a further advantageous embodiment of the invention, the second joint is a cardan joint.

According to a further advantageous embodiment of the invention, the second joint is a constant velocity joint.

Further advantages and advantageous embodiments of the invention can be obtained from the following description, the drawing and the claims.

DRAWING

The drawing shows a model embodiment of the invention which is described in more detail below. Illustrations.

DESCRIPTION OF THE MODEL EMBODIMENT

FIGS. 1 to 5 show a model embodiment of an industrial robot with parallel kinematics according to the delta principle having a robot base 1, a carrier element 2 to which a gripper, a tool or a machine element can be arranged, and three actuating units 4 in the form of control arms. A gripper, a tool or a machine element are not shown in the drawing. Each of the three actuating units is connected by means of a drive shaft not identifiable in the drawing to an actuating-unit drive 6 in the form of a motor. The actuating-unit drives generate a torque. All three actuating units 4 have the same design. The actuating units 4 comprise an upper arm section 7 and a lower arm section 8. The upper arm section 7 is characterised by high stability and low weight. Each actuating-unit drive 6 transmits a torque to the upper arm section 7 connected to it. The lower arm section 8 comprises two parallel running rods 9 and 10. The two rods 9 and 10 of the lower arm section 8 of an actuating unit 4 are connected by means of joints 11 at their upper end to the upper arm section 7 of the actuating unit 4 and by means of joints 12 to the carrier element 2.

The industrial robot is also equipped with a telescope 13. It is used to transmit a torque to a gripper or tool or machine element, not shown in the drawing, on the carrier element 2. The telescope 13 thus takes the form of a telescopic axis. The telescope 13 comprises two telescopic tubes that can be displaced within one another: an inner telescopic tube 15 and an outer telescopic tube 16. The displaceable mounting allows variations in distance between the robot base 1 and the carrier element 2 in a movement of the actuating units 4 to be compensated. The outer telescopic tube 16 is moveably connected to the robot base 1 by means of a first joint 17 with multiple degrees of freedom. The first joint 17 takes the form of a cardan joint and exhibits two joint parts 18 and 19 which take the form of joint forks and are rotatably arranged around axes running perpendicular to one another. Such a joint is also referred to as a universal joint.

The inner telescopic tube 15 of the telescope 13 is moveably connected to the carrier element 2 by means of a second joint 23 with multiple degrees of freedom. The second joint likewise takes the form of a cardan joint. The two joints 17, 23 allow the telescope 13 to follow a deflection of the carrier element 2 relative to the robot base 1.

A rotary lifting module 24 is arranged on the robot base 1. This is especially discernible in FIG. 3. The rotary lifting module 24 comprises a spindle 25, a ball screw drive nut 26, a spline shaft nut 27, a bracket 28 for the ball screw drive unit 26 and the spline shaft nut 27, a drive 29 for the ball screw drive nut 26 with a drive belt 30 and a drive 31 for the spline shaft nut 27 with a drive belt 32. The bracket 28 and the two drives 29, 31 arranged in a fixed position on the robot base 1. The first joint 17 is arranged at one end of the spindle 25.

Figure 1:
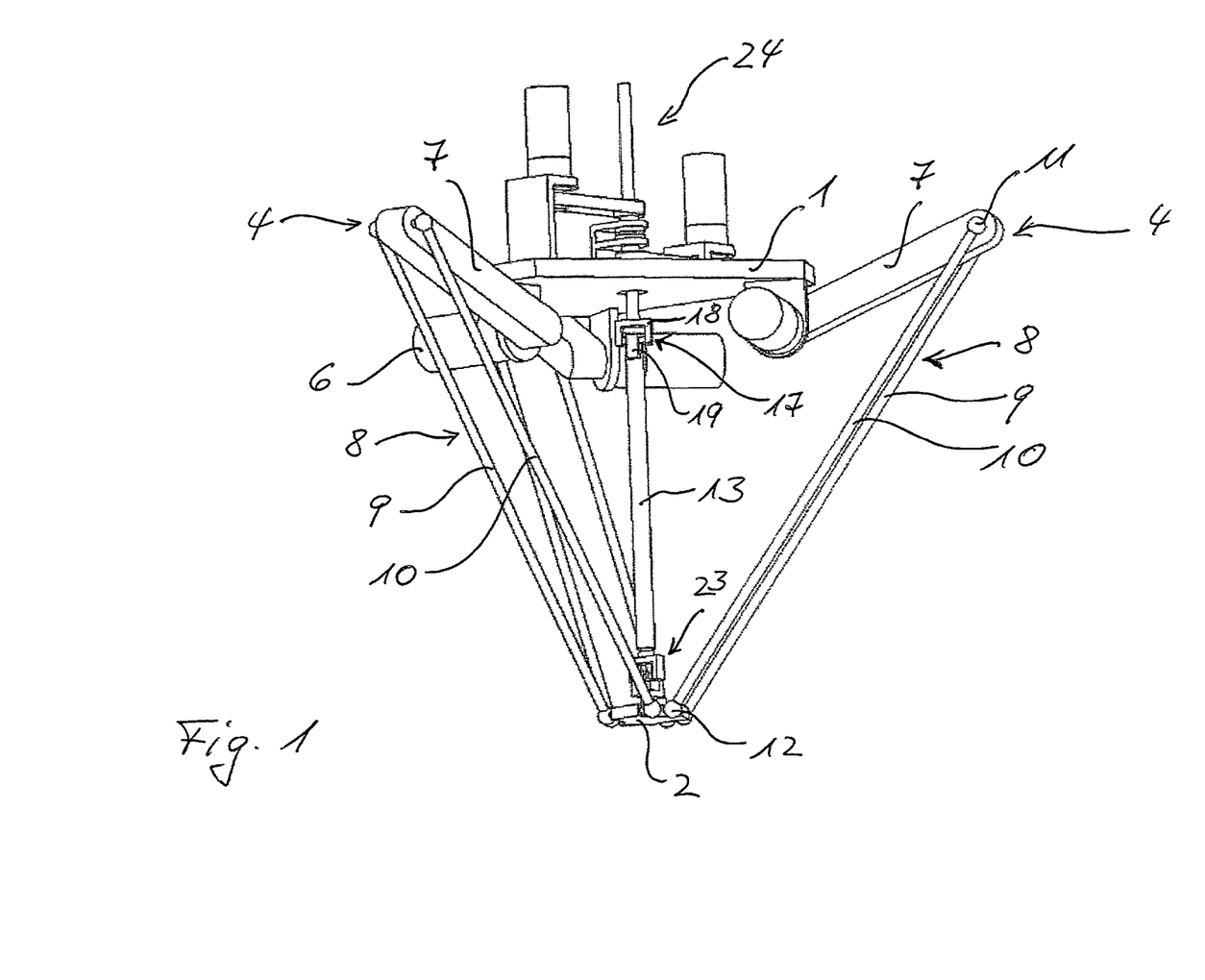
FIG. 1 Model embodiment of an industrial robot with parallel kinematics in a perspective view FIG. 2 Section through the industrial robot as shown in FIG. 1 in a perspective view from above, whereby the detail illustrated in FIG. 4 is marked with a circle and with z FIG. 3 Detail from FIG. 2
Figure 2:
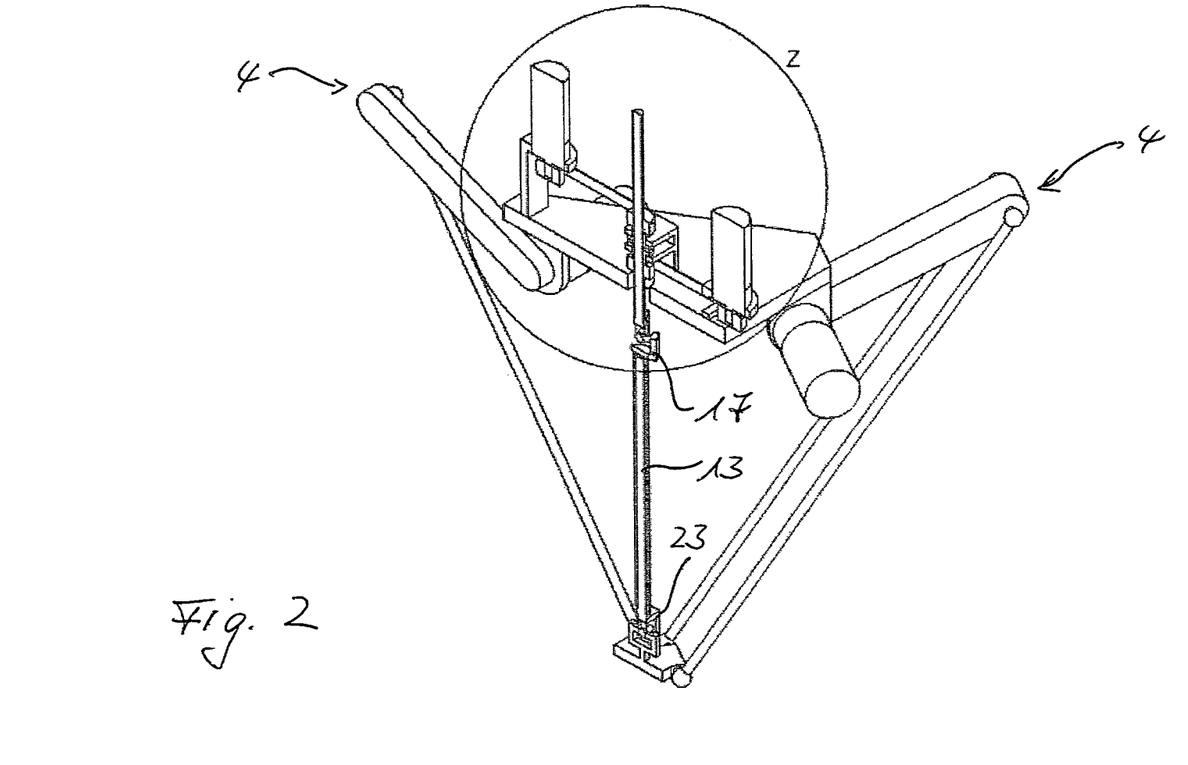
Figure 3:
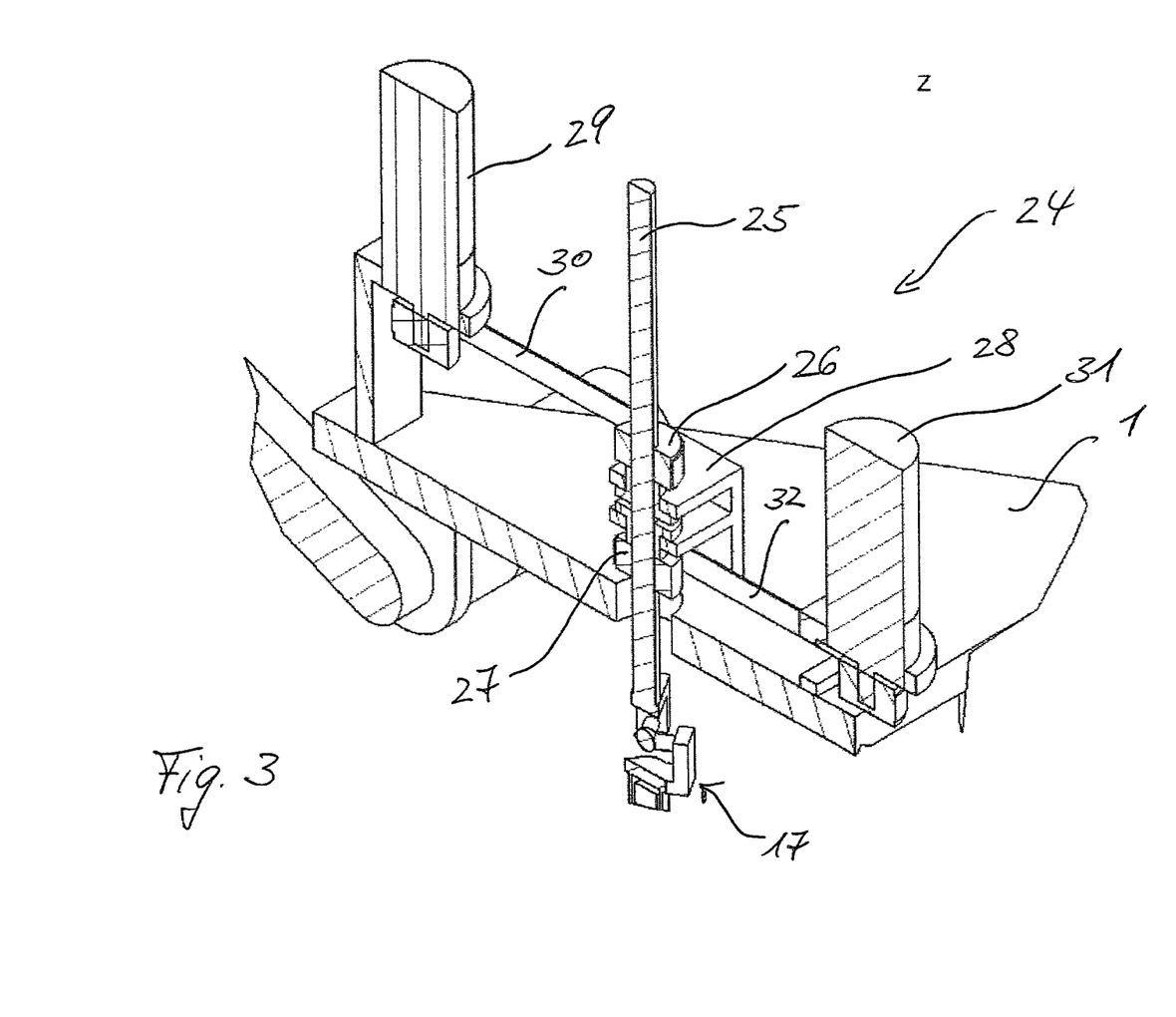

The ball screw drive nut 26 and the spline shaft nut 27 each exhibit a groove running circumferentially into which the bracket 28 engages. This means that the ball screw drive nut 26 and spline shaft nut 27 driven separately or jointly to rotate by the drives 29, 31 do not change their position relative to the robot base 1.

If only the ball screw drive nut 26 is driven to rotate and the spline shaft nut 27 is not, the spindle 25 is moved linearly along its longitudinal axis. The direction of movement of the spindle 25 depends on the direction of rotation of the ball screw drive nut 26.

If only the spline shaft nut 27 is driven to rotate and the ball screw drive nut 26 is not, the spindle 25 executes a spiral movement that is composed of a translation along its longitudinal or spindle axis and a rotational movement around its longitudinal or spindle axis. The direction of movement of the spindle depends on the direction of rotation of the spline shaft nut 27.

If the ball screw drive nut 26 and the spline shaft nut 27 are driven to rotate by their drives 29, 31, the spindle 25 executes a rotational movement around its longitudinal or spindle axis. The direction of rotation of the spindle 25 depends on the directions of rotation of the ball screw drive nut 26 and the spline shaft nut 27.

The movement of the spindle 25 is transmitted to the first joint 17 and the telescope 13.

Figure 4:
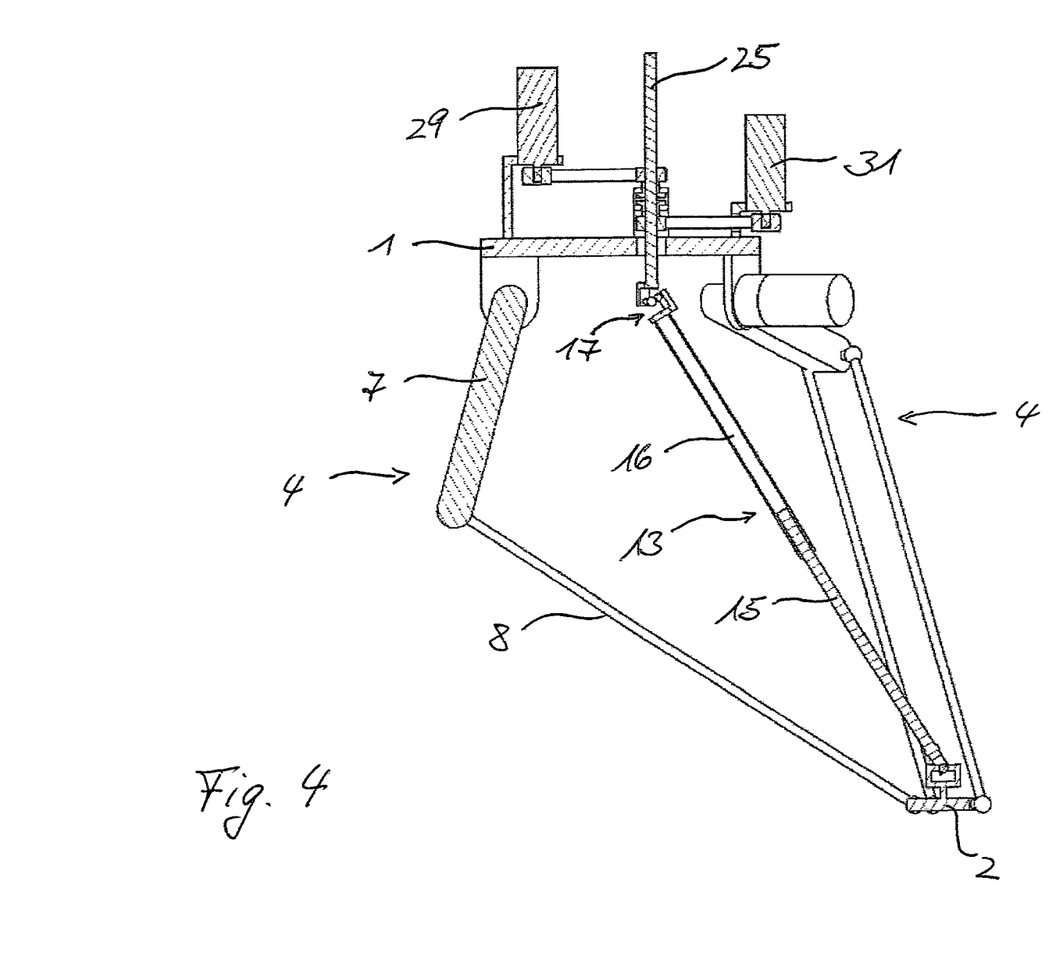
FIG. 4 Industrial robot as shown in FIG. 1 with extended telescope in a cross-section view FIG. 5 Industrial robot as shown in FIG. 1 with extended telescope and extended spindle in a cross-section view
Figure 5:
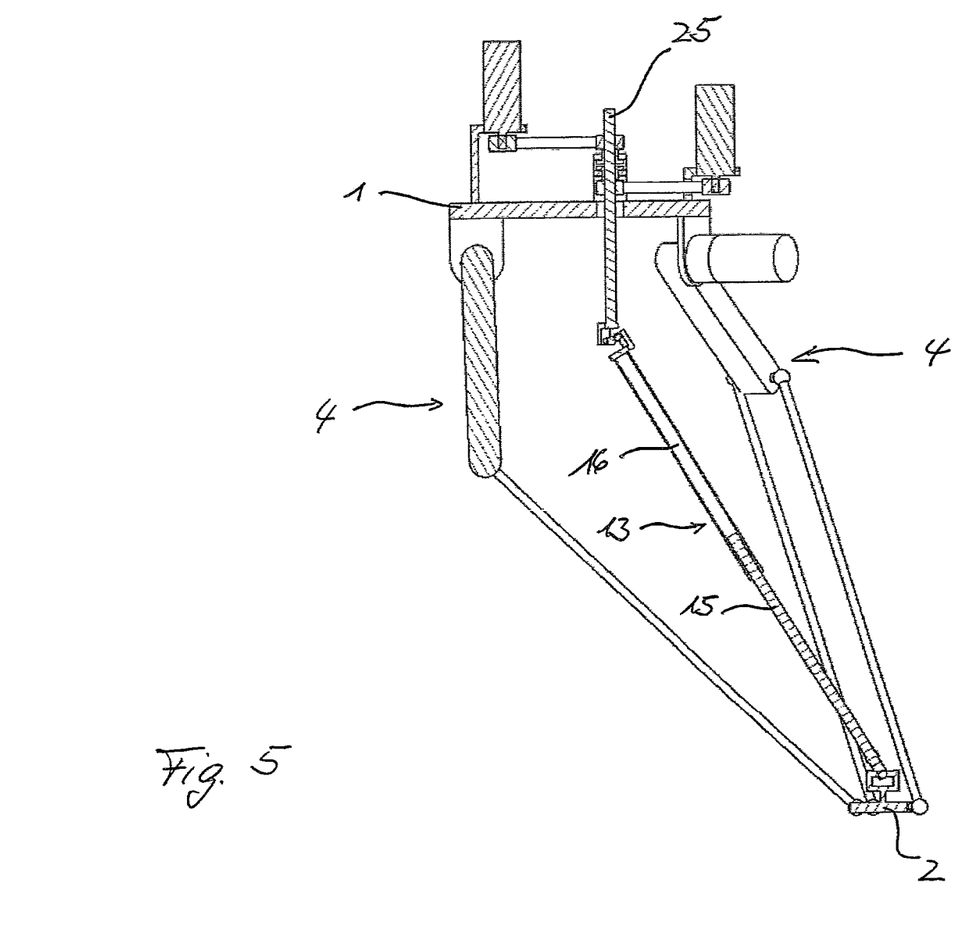

FIGS. 4 and 5 show the telescope 13 in its maximum length, where the inner telescopic tube 15 projects beyond the outer telescopic tube 16 except for an end section. The difference between FIGS. 4 and 5 consists in the position of the spindle 25 and the first joint 17. In FIG. 5 the spindle 25 is moved down in respect of the position in FIG. 4. The distance between the first joint 17 and the robot base 1 is thereby greater in FIG. 5 than in FIG. 4. As a consequence, the actuating units 4 can move the carrier element 2 further down.

All features of the invention can be material to the invention both individually and in any combination.

REFERENCE NUMBERS

1 Robot base
2 Carrier element
3
4 Actuating unit
5
6 Actuating-unit drive
7 Upper arm section
8 Lower arm section
9 Rod
10 Rod
11 Joint
12 Joint
13 Telescope
14
15 Inner telescopic tube
16 Outer telescopic tube
17 First joint with multiple degrees of freedom
18 Joint fork
20
21
22
23 Second joint with multiple degrees of freedom
24 Rotary lifting module
25 Spindle
26 Ball screw drive nut
27 Spline shaft nut
28 Bracket
29 Drive of the ball screw drive nut
30 Drive belt
31 Drive of the spline shaft nut
32 Drive belt

The invention claimed is:

1. An industrial robot with parallel kinematics, the industrial robot comprising:

a robot base, a carrier element for holding a gripper, a tool or a machine element, actuating unit drives arranged on the robot base, at least two moveable actuating units each having a first end and a second end, wherein the first end is connected to a respective actuating unit drive of the actuating unit drives and the second end is moveably connected to the carrier element, a telescopic element moveably arranged between the robot base and the carrier element, a first joint having multiple degrees of freedom moveably connecting the telescopic element to the robot base, a second joint having multiple degrees of freedom moveably connecting the telescopic element to the carrier element, and a drive unit arranged on the robot base, the drive unit adapted to transmit a rotational movement and a linear movement, wherein the drive unit transmits a torque to the first joint, the first joint transmits the torque to the telescopic element and the telescopic element transmits the torque to the gripper, tool or machine element, and wherein the first joint is displaceably mounted on the robot base with respect to a position of the first joint relative to the robot base such that the drive unit moves the first joint along a linear axis with respect to the robot base by the linear movement, thereby changing a distance between the first joint and the robot base.

2. The industrial robot according to claim 1, wherein the drive unit comprises a spindle drive.

3. The industrial robot according to claim 2, wherein the spindle drive comprises a spindle directly or indirectly linked to the first joint.

4. The industrial robot according to claim 3, wherein the spindle drive is arranged on a side of the robot base that faces away from the carrier element and wherein the robot base comprises a through opening through which the spindle or a shaft linked to the spindle is guided.

5. The industrial robot according to claim 2, wherein the spindle drive comprises a ball screw drive.

6. The industrial robot according to claim 1, wherein the drive unit comprises a positively locked shaft arrangement.

7. The industrial robot according to claim 1, wherein the drive unit comprises a ball screw spline.

8. The industrial robot according to claim 1, wherein the robot base is equipped with a linear guide having a guide body and the first joint is directly or indirectly linked to the guide body.

9. The industrial robot according to claim 8, wherein the linear guide comprises a slideway or a rolling guideway.

10. The industrial robot according to claim 1, wherein the first joint is a cardan joint.

11. The industrial robot according to claim 1, wherein the first joint is a constant-velocity joint.

12. The industrial robot according to claim 1, wherein the second joint is a cardan joint.

* * * * *